(12) United States Patent
Stanton et al.

(10) Patent No.: US 6,314,506 B1
(45) Date of Patent: Nov. 6, 2001

(54) METHOD AND APPARATUS FOR DETERMINING A NEXT ADDRESS WITHIN A BINARY SEARCH ALGORITHM

(75) Inventors: Kevin B. Stanton, Hellerup (DK); Richard Reohr, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,626

(22) Filed: Dec. 28, 1998

(51) Int. Cl.[7] ....................................................... G06F 12/00
(52) U.S. Cl. ......................... 711/220; 711/217; 711/218; 711/213; 365/230.01; 365/230.02
(58) Field of Search .................................... 711/217, 218, 711/220, 213; 365/230.01, 230.02

(56) References Cited

U.S. PATENT DOCUMENTS

| | | | |
|---|---|---|---|
| 3,729,718 | * | 4/1973 | Dufton et al. . |
| 5,758,148 | * | 5/1998 | Lipovski ................................... 707/6 |
| 5,983,333 | * | 11/1999 | Kolagotla et al. ................... 711/219 |

* cited by examiner

Primary Examiner—Do Hyun Yoo
Assistant Examiner—Mehdi Namazi
(74) Attorney, Agent, or Firm—Kenyon & Kenyon

(57) ABSTRACT

A method and apparatus are presented for implementing the next-address determination within a binary search algorithm. A binary search algorithm searches for a compared within a one dimensional sorted array of elements. Typically, a binary search algorithm comprises a comparator and a next address generator. The next address generator determines the address of the next array element (the "next address") a comparator will search using both a "compared is greater" signal from the comparator and a signal which indicates the address of the last array the comparator searched (the "previous address"). The time needed to search an array for a compared inserts a delay in applications where a binary search algorithm is employed. One method of expediting the searching process is to minimize the number of gates between the input and output of the next address generator (the "critical path"). In an embodiment of the present invention, two gate levels are used within the critical path to increase the rate at which a search can be performed even when the search is interrupted and resumed after performing some other task.

19 Claims, 3 Drawing Sheets

METHOD AND APPARATUS FOR DETERMINING A NEXT ADDRESS WITHIN A BINARY SEARCH ALGORITHM

BACKGROUND

1. Field

The present invention pertains to a method and apparatus for implementing a binary search algorithm. More particularly, the present invention pertains to using exclusively combinatorial logic elements to implement a next address determination within a binary search algorithm.

2. Background Information

Binary search algorithms are used to locate a particular entry (known as the "compared") within a sorted array of elements. The elements of a sorted array may be visualized as a series of vertically stacked shelves. In a 16 element array, for example, the top shelf corresponds to element 1 and the bottom shelf corresponds to element 16. The numbers or words stored within the 16 elements of the array are typically sorted in increasing order from element 1 to element 16. Each array element is identified with a unique address.

A typical binary search algorithm includes a comparator and a next address generator. A binary search algorithm usually begins conducting a search at the middle array element. The comparator compares the compared to the entry stored in the middle array element and sends a comparison result to the next address generator. The next address logic circuit receives the comparison result from the comparator and uses this result to determine the address of the next array element which should be searched.

Current next address generators typically determine the next address using two pointers. At the beginning of a search, one pointer is positioned at the address of the top element of the array and the second pointer is positioned at the address of the bottom element of the array. The number of array addresses between the pointers is then determined and divided in half (averaged) to identify the address of the middle array element. One of the two pointers is then positioned at the middle array element. The comparator then compares the compared with the value stored in the middle array element and sends a comparison result to the next address generator. The next address generator uses the comparison result and the previous address to determine the next address which will be searched. If the compared is greater than the value stored in the middle element, the lower half of the array will be searched using the averaging technique described above and the upper half of the array will be eliminated from consideration. If the compared is not greater than the value stored in the middle element, the upper half of the array will be searched using the averaging technique and the lower half of the array will be eliminated from consideration. These comparing and eliminating steps are repeated until the comparand is located within an array element or until all the array elements have been searched.

A circuit used to determine the next address using the pointer method described above employs some form of memory to maintain the pointer positions. Typically, the circuit comprises a combination of devices which implement both combinatorial logic and sequential logic. Generally, combinatorial logic includes operations which are executed using boolean algebra. Boolean algebra is two-state (binary) symbolic logic used in digital systems. The two binary states are typically a "1" and a "0". Thus boolean algebra entails performing operations on binary words which consist of 1's and 0's. The circuit components which perform boolean algebra operations are known as logic gates. AND, OR and NOT logic gates perform the three basic boolean algebra operations. These three gates may be combined to perform more complex operations. Combinatorial logic gates receive binary words at one or more inputs, perform an operation on the input binary word(s), and output a binary word(s) which represent the result of the performed operation. Sequential logic is similar to combinatorial logic. However, devices which perform sequential logic include a capacity to store binary data for a period of time. Thus, the binary word(s) input to a sequential logic device or the binary result of the sequential logic operation may be stored in a memory. Flip flops and shift registers are examples of sequential logic devices. Flip flops and/or shift registers are typically included within a circuit which implements the pointer method described above to maintain the pointer positions.

The time required for a binary search algorithm to search an array may be reduced by either reducing the number of logic gates between the input and output of the next address circuit or by reducing the number of logic gates between the input and output of the comparator. In general, circuits which consist purely of combinatorial logic elements are more simple than circuits which include sequential logic elements. Accordingly, there is a need for a search procedure which is purely combinatorial and includes a minimal number of logic gates between the input and output of the next address generator.

SUMMARY

According to an embodiment of the present invention, a circuit for determining a next address within a search procedure is provided. The circuit comprises a next address generator having a first input adapted to receive a previous address signal and a second input adapted to receive a first control signal indicating whether a comparand is greater than the value stored in a previous address. The next address generator generates a next address signal at an output based on the first and second inputs. The next address generator is exclusively made of combinatorial logic elements.

DETAILED DESCRIPTION

Binary search algorithms may be used, for example, to implement a content addressable memory (CAM). CAM's, such as the integrated chips manufactured by MUSIC Semiconductor, are often used in networking applications where a long word must be identified very quickly from among a table (array) of long words. For example, if a message is sent a great distance between computers on the Internet, the message may pass through one or more routers. A router is a device which forwards packets of data between networks. Routers commonly include a plurality of ports.

For example a router may include 8, 12, or 24 ports. A message received by a router is sent through a particular router port depending upon the message's destination. One example of a function performed by a router includes analyzing received messages to identify the message's destination computer and sending the received message through the port which connects the router to that destination computer. Each network computer includes a network card with a unique number known as a media access control (MAC) address. Messages sent to and from a particular computer include that computer's unique MAC address. When a router identifies a MAC address within a received message, the router may implement a binary search algorithm to locate the MAC address in a table. This table may include thousands of stored MAC addresses. The table entry identifies the router port to which the message should be routed. Thus, a network can increase the speed with which messages are exchanged by decreasing the amount of time required for routers to find MAC addresses within tables.

Figure 1:
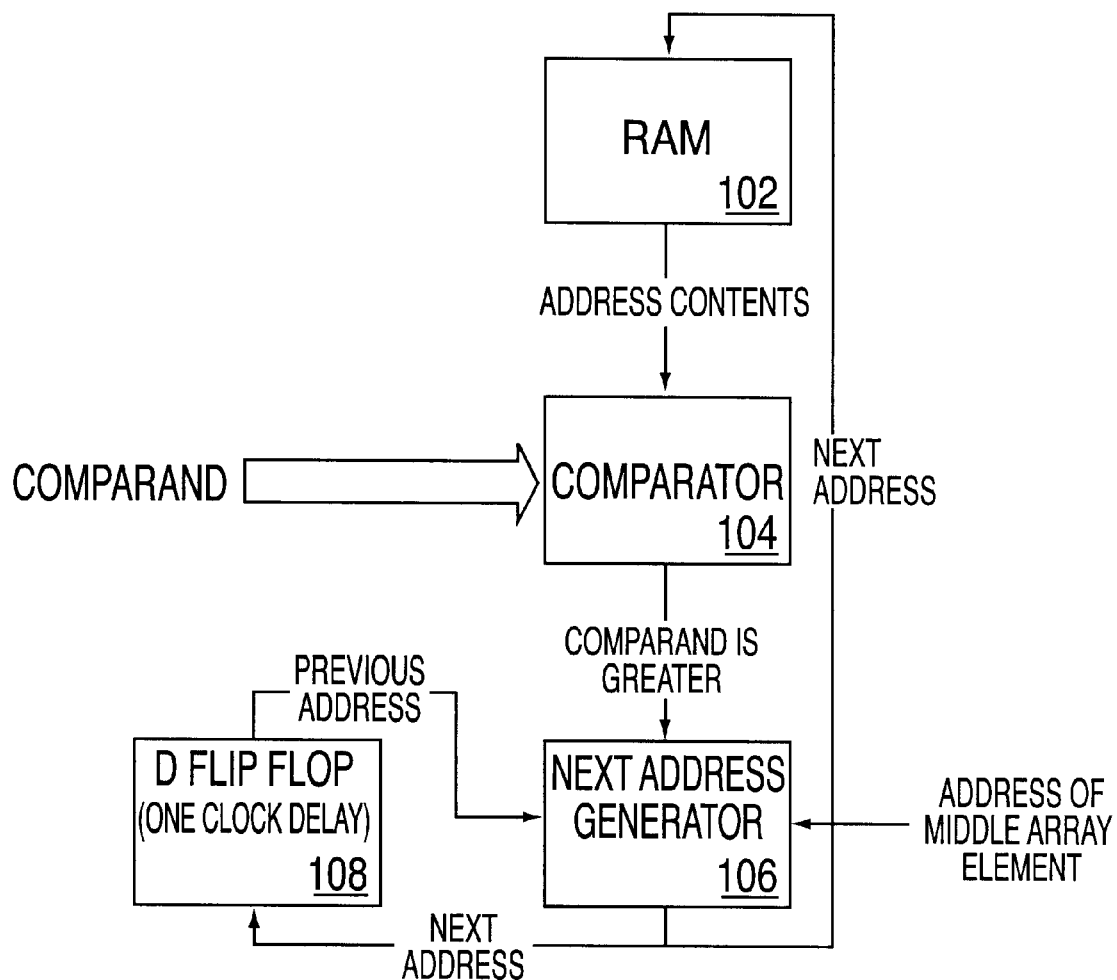
FIG. 1 shows a general diagram of a system for implementing a binary search algorithm, in accordance with an exemplary embodiment of the present invention.

FIG. 1 shows a general diagram of a system for implementing a binary search algorithm, in accordance with an exemplary embodiment of the present invention. In this embodiment, a random access memory (RAM) segment 102 stores a sorted one dimensional array of elements. Each element is identified by an address number. A comparator 104 is adapted to receive an output signal from RAM segment 102. This output signal (referred to in FIG. 1 as the "address contents") represents the value stored in an element corresponding to a particular address number. A next address logic generator (circuit) 106 is adapted to receive an output signal from comparator 104 and a D flip flop 108. RAM segment 102 is adapted to receive an output signal from next address generator 106. D flip flop 108 is adapted to receive an output signal from next address generator 106.

An example of the method for locating a particular element within a sorted one dimensional array will now be described with respect to FIG. 1. First, a signal representing a number or word (the "comparand") the user wishes to locate within the one dimensional array is input to comparator 104. An outside logic circuit (not shown in FIG. 1) then sends, to next address generator 106, a signal used to set the next address as the middle element of the array. Next address generator 106 then generates a next address output signal which represents the address of the middle element of the array. Upon receiving the next address signal from next address generator 106, RAM segment 102 sends comparator 104 a signal which represents the contents of the middle element of the array. Thus, if the one-dimensional array stored within RAM segment 102 includes 16 elements, comparator 104 will receive a signal representing the contents of element 8. Next, comparator 104 compares the value of the comparand with the value received from the middle element of the stored one-dimensional array. Comparator 104 then outputs a signal which indicates whether the value of the comparand is greater than the value of the contents stored in the middle element (e.g., as a binary "comparand is greater" output). The "comparand is greater" output signal is sent from comparator 104 to next address generator 106. At the same time, next address generator 106 receives, from D flip flop 108, a signal which indicates the address which was previously searched by the binary search algorithm. Using the previous address and "comparand is greater" input signals, the next address generator determines the address for the array element which should next be searched for the comparand (e.g., as a binary "next address" output). The next address output signal from next address generator 106 is sent to RAM segment 102 and D flip flop 108. D flip flop 108 delays the next address input signal by one clock cycle to ensure this address arrives at next address generator 106 at the same time the most recent "comparand is greater" signal is received from comparator 104. The above steps are repeated until half of the array elements have been searched or until the comparand value is found within the array.

Figure 2:
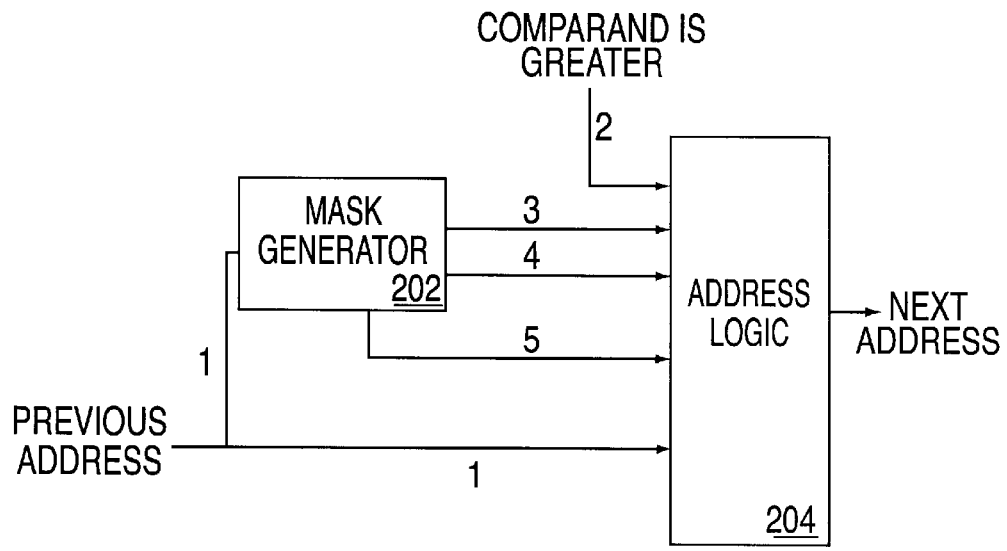
FIG. 2 shows a more detailed example of the next address generator of FIG. 1, in accordance with an exemplary embodiment of the present invention.

FIG. 2 shows a more detailed example of the next address generator of FIG. 1, in accordance with an exemplary embodiment of the present invention. The next address generator of FIG. 2 comprises a mask generator 202 and an address logic device 204. Mask generator 202 is a combinatorial logic device adapted to receive a previous address signal 1. Address logic device 204 is a combinatorial logic device adapted to receive a control signal 2 indicating whether a comparand is greater than the contents stored in a previous array address and the previous address signal. Address logic 204 is also adapted to receive two mask signals (3 and 4) and a left filled mask signal 5 from mask generator 202. Both the mask signal and the left filled mask signal will be described in greater detail below.

Figure 3:
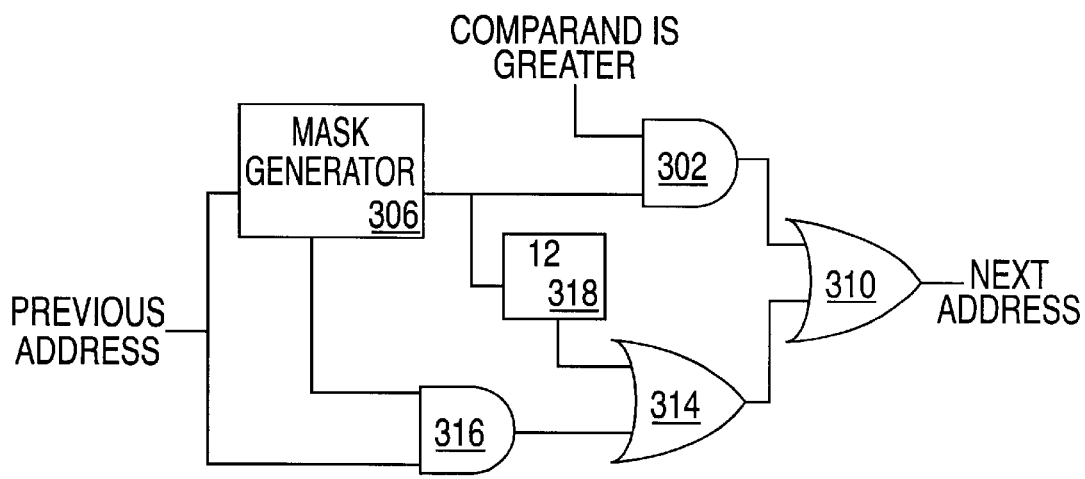
FIG. 3 shows a more detailed example of the address logic device of FIG. 2, in accordance with an exemplary embodiment of the present invention.

FIG. 3 shows a more detailed example of the address logic device of FIG. 2, in accordance with an exemplary embodiment of the present invention. In FIG. 3, an AND gate 302 is adapted to receive both an input signal from a mask generator 306 and a "comparand is greater" input signal from a comparator (such as comparator 104 described with reference to FIG. 1). An OR gate 310 is adapted to receive an input signal from AND gate 302 and an input signal from an OR gate 314. OR gate 314 is adapted to receive an input signal from a right shift device 318 and a signal from an AND gate 316. Right shift device 318 is a combinatorial logic device which shifts the value of a bit within a binary word one position to the right. Right shift device 318 is adapted to receive a mask signal from mask generator 306. AND gate 316 is adapted to receive an input signal which represents a previous address and a left filled mask input signal from mask generator 306.

The operation of a next address generator in accordance with an exemplary embodiment of the present invention will now be explained with reference to FIG. 1 and FIG. 3. Assume the user wishes to find a number located within a 16-element array. Binary words which include four bits are required to assign each of the 16 array elements with a unique address. Each bit within a word may be set "high" (e.g., a binary 1) or "low" (e.g., a binary 0)(unless otherwise specified, in this document, binary words sent and received among components are represented by electrical signals). As mentioned previously, the binary search algorithm may begin searching with the middle element of the array. In this example, the middle element is element 8 (represented by the four bit binary word 1000). Thus, comparator 104 first compares the comparand with the value stored in element 8. Comparator 104 then checks element 4 if the comparand is not greater than the value in element 8. Comparator 104 checks element 12 if the comparand is greater than the value in element 8.

In this example, assume comparator 104 sends a signal to the next address generator of FIG. 3 which indicates that the comparand is greater than the value stored in element 8. In this case, the "comparand is greater" signal represents a binary 1111 (a binary 0000 indicates the comparand is not greater than the value stored in a particular element). Thus, the first input of AND gate 302 will receive a value of 1111. The previous address signal input signal to mask generator 306 is a binary 8 (1000). Mask generator 306 processes the previous address input signal and generates two output signals. A first output signal is sent to both AND gate 302 and right shift device 318. A second output signal is sent to AND gate 316.

The first mask generator output signal is a mask signal in which one bit is set to a binary 1. To determine which bit should be set to a 1, the mask generator analyzes the input binary word from right to left. The mask generator searches the binary word to locate the first bit set to a 1. This bit is set to a 1 in the output signal and the remaining bits in the binary word are set to a binary 0 in the output signal. The location of this set bit is where the comparand is greater bit will become part of the next address. An example of the steps mask generator 306 executes to generate the first mask generator output signal are shown below in Very High Speed Integrated Circuit Hardware Description Language (VHDL):

```
MaskGenerator: process (PreviousAddress)
begin
    mask <=(others => '0');
    for i in 0 to length-1 loop
        if Previous Address (i) = '1' then
            Mask(i) <= '1';
        end if;
    end loop;
end process MaskGenerator;
```

In this example, the binary word input to mask generator 306 is 1000. From right to left, the first bit set to a 1 is the fourth bit from the right. Thus, the first output signal from mask generator 306 is a binary word where the fourth bit from the right is set to 1 and the remaining bits are set to 0. In this case the input value, 1000, results in a 1000 output to AND gate 302.

Mask generator 306 also performs steps which generate a second output signal using the previous address input signal. This second output signal is sent to AND gate 316 and is referred to herein as the "left filled mask". Mask generator 306 analyzes the input binary word from right to left to locate the first binary 1. The second output signal consists of a binary word in which each bit to the left of this first binary 1 is set to 1. An example of the steps mask generator 306 executes to determine the second mask generator output signal are shown below in VHDL) language:

```
GenerateLeftFilled Mask: process(mask)
Variable tempLeftFilled Mask: std_logic_vector (length-1 downto 0);
begin
    tempLeftFilledMask := mask(length-1 downto 0) & '0';
    for i in 0 to length-2 loop
        If tempLeftFilledMask(i) = '1' then
            tempLeftFilledMask (i+1) := '1';
        end if;
    end loop;
    --Assign the actual signal from the temporary variable.
    LeftFilledMask <=tempLeftFilledMask;
end process GenerateLeftFilledMask;
```

In this example, the binary input to mask generator 306 is 1000. Thus, to determine the left filled mask output, mask generator 306 analyzes 1000 to locate the first binary 1 from the right. In this case, the first bit set to 1 is the fourth bit from the right. Thus, each bit to the left of the fourth bit is set to 1. In this case the left filled mask output signal sent to AND gate 316 is a binary 0000.

As mentioned above, AND gate 316 receives both a 0000 left filled mask output signal from mask generator 306 and a previous address input signal of 1000 in this example.

Thus, the output signal of AND gate 316 is a binary 0000. This output signal is sent to OR gate 314.

Right shift device 318 receives the first output signal from mask generator 306. In this example, this output signal is 1000. Right shift device 318 divides the received binary word in half by shifting the 1 bit to the right one bit. Thus the input signal to right shift device 318 is 1000 and the output signal is 0100. This output signal is sent to OR gate 314.

As mentioned above, OR gate 314 receives 0100 and 0000 as inputs. Thus the output signal of OR gate 314 is 0100. This output signal is sent to OR gate 310. OR gate 310 now receives 1000 and 0100 as inputs. The output signal of OR gate 310 is 1100 (the binary representation of the number 12). The next address generator will output a signal which indicates address 12 is the next array location which will be searched by comparator 104. Address 12 represents the middle array element in the lower half of the array in this example. The above mentioned steps are repeated beginning with comparator 104 determining whether the value stored in element 12 is greater than or equal to the comparand. The search is complete when either the binary search algorithm locates the address of the array element which includes a value equal to the comparand or the algorithm has searched each array element.

Figure 4:
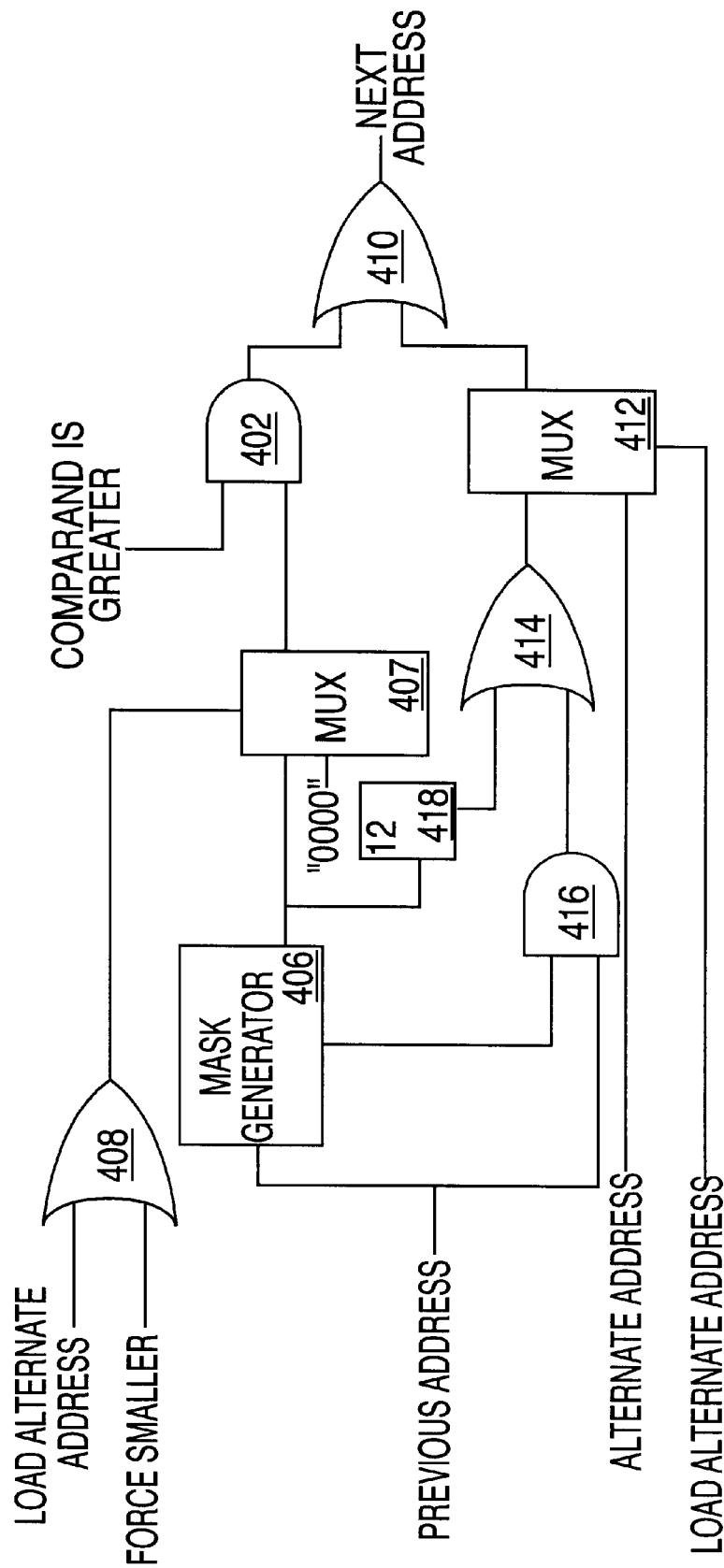
FIG. 4 shows another more detailed example of the address logic device of FIG. 2, in accordance with an exemplary embodiment of the present invention.

FIG. 4 shows another more detailed example of the address logic device of FIG. 2, in accordance with an exemplary embodiment of the present invention. The circuit of FIG. 4 includes 2 multiplexers and 1 OR gate in addition to the elements described with reference to the circuit of FIG. 3. Each of these three additional elements are combinatorial devices. A multiplexer 404 is adapted to receive an input signal from an OR gate 408, an input signal from a mask generator 406, and an input signal which represents a binary zero. OR gate 408 is adapted to receive both an input signal which indicates whether an alternate address should be loaded and a force smaller input signal. Multiplexer 412 is adapted to receive an input signal from OR gate 414, an input signal which represents an alternate address, and a select signal which indicates whether an alternate address should be loaded. An AND gate 402 is adapted to receive an input signal from multiplexer 404. An OR gate 410 is adapted to receive an input signal from multiplexer 412.

The circuit of FIG. 4 enables two additional capabilities. First, the circuit of FIG. 4 enables the user to interrupt an ongoing search (as described above) and resume the search upon the completion of another task. If the user wishes to perform maintenance on an array by inputting a number into an element, the user sends a load alternate address signal to both an input of OR gate 408 and an input to multiplexer 412. This binary 1 input to OR gate 408 results in multiplexer 404 selecting the binary zero input as the output signal sent to AND gate 402. This binary zero input to AND gate 402 ensures the output signal sent from AND gate 402 to OR gate 410 is always a binary zero. The load alternate address input to multiplexer 412 causes multiplexer 412 to select the alternate address as the output signal sent to OR gate 410. Thus, the output signal of OR gate 410 is the alternate address because the other input to OR gate 410 is a binary zero. Once the load alternate address signal is removed from OR gate 408 and multiplexer 412, the next address circuit will resume searching the array.

The circuit of FIG. 4 also enables the user to force the next address circuit to begin searching at a lower array element address than the middle element. Suppose an array has 16 elements, but only the first 5 elements contain entries. As describe above, the next address circuit begins searching with the middle element. In this case, the middle element (element 8) does not contain an entry. The force smaller input to the circuit of FIG. 4 forces the comparator to begin searching with an address lower than the middle element. In a manner similar to that described above, a binary 1 sent to an input of OR gate 408 results in a binary zero input to OR gate 410. Thus, during a search, the force smaller input signal indicates the current address is not within the set of valid memory comparands and that the binary search algorithm should next search the middle element in the half of the array which includes the elements storing the smallest values.

Although several embodiments are specifically illustrated and described herein, it will be appreciated that modifications and variations of the present invention are covered by the above teachings and within the purview of the appended claims without departing from the spirit and intended scope of the invention. For example, although the address logic device of FIG. 4 includes both the force smaller and load alternate address capabilities, the present invention is intended to cover a similar address logic device which includes only one of these capabilities.

What is claimed is:

1. A circuit for determining a next address within a search procedure, comprising:
    a next address generator having a first input and a second input, said first input adapted to receive a previous address signal and said second input adapted to receive a first control signal indicating whether a comparand is greater than a value stored in a memory location identified by a previous address signal, said next address generator including an address logic including
    at least a first combinatorial logic gate to receive said first control signal and a first mask signal;
    at least a second combinatorial logic gate to receive the first mask signal, a second mask signal and said previous address signal; and
    at least a third combinatorial logic gate coupled to an output of said first combinatorial logic gate and an output of said second combinatorial logic gate;
    wherein said next address generator generates a next address signal at an output, said next address signal based on both said first input and said second input; and
    wherein said next address generator is made exclusively of combinatorial logic elements.

2. The circuit of claim 1, further comprising:
    a mask generator coupled to said address logic and adapted to receive said previous address signal.

3. The circuit of claim 2, wherein
    said at least a first combinatorial logic gate includes a first AND gate;
    said at least a second combinatorial logic gate includes a second AND gate adapted to receive the second mask signal from said mask generator and said previous address signal;
    a right shift device adapted to receive said first mask signal from said mask generator; and
    a first OR gate adapted to receive an output signal from said second AND gate and an output signal from said right shift device; and
    said at least a third combinatorial logic gate includes a second OR gate adapted to receive an output signal from said first AND gate and an output signal from said first OR gate, said second OR gate adapted to output said next address signal.

4. The circuit of claim 2, wherein said address logic farther comprises:
    a first multiplexer adapted to receive the first mask signal from said mask generator, a force smaller signal, and a binary zero signal; and
    said at least a first combinatorial logic gate includes a first AND gate adapted to receive said first control signal and an output signal from said first multiplexer;
    said at least a second combinatorial logic gate includes a second AND gate adapted to receive the second mask signal from said mask generator and said previous address signal;
    a right shift device adapted to receive said first mask signal from said mask generator; and
    a first OR gate adapted to receive an output signal from said second AND gate and an output signal from said right shift device; and
    said at least a third combinatorial logic gate includes a second OR gate adapted to receive an output signal from said first AND gate and an output signal from said first OR gate, said second OR gate adapted to output one of said next address signal and a signal identifying a lower address than said next address signal.

5. The circuit of claim 2, wherein said address logic further comprises:
    a first multiplexer adapted to receive the first mask signal from said mask generator, a load alternate address signal, and a binary zero signal;
    said at least a first combinatorial logic gate includes a first AND gate adapted to receive said first control signal and an output signal from said first multiplexer;
    said at least a second combinatorial logic gate includes a second AND gate adapted to receive the second mask signal from said mask generator and said previous address signal;
    a right shift device adapted to receive said first mask signal from said mask generator; and
    a first OR gate adapted to receive an output signal from said second AND gate and an output signal from said right shift device;
    a second multiplexer adapted to receive an output signal from said first OR gate, an alternate address signal and a load alternate address signal; and
    said at least a third combinatorial logic gate includes a second OR gate adapted to receive an output signal from said first AND gate and an output signal from said second multiplexer, said second OR gate adapted to output one of said next address signal and said alternate address signal.

6. The circuit of claim 2, wherein
    said at least a first combinatorial logic gate includes a first OR gate adapted to receive at least one of a load alternate address signal and a force smaller signal;
    a first multiplexer adapted to receive the first mask signal from said mask generator, an output signal from said first OR gate and a binary zero signal; and
    a first AND gate adapted to receive said first control signal and an output signal from said first multiplexer;
    said at least a second combinatorial logic gate includes a second AND gate adapted to receive the second mask signal from said mask generator and said previous address signal;
    a right shift device adapted to receive said first mask signal from said mask generator;
    a second OR gate adapted to receive an output signal from said second AND gate and an output signal from said right shift device; and a second multiplexer adapted to receive an output signal from said second OR gate, an alternate address signal and said load alternate address signal; and said at least a third combinatorial logic gate includes a third OR gate adapted to receive an output signal from said first AND gate and an output signal from said second multiplexer, said third OR gate adapted to output one of said next address signal, said alternate address signal, and a signal identifying a lower address than said previous address signal.

7. A method for determining a next address within a search procedure, comprising:

receiving, by a next address generator, both a previous address signal and a first control signal indicating whether a comparand is greater than a value stored in a previous address; and generating a next address signal at an output of said next address generator;

wherein said next address generator includes an address logic that is made exclusively of combinatorial logic elements said address logic including
at least a first combinatorial logic gate receiving said first control signal and a first mask signal;
at least a second combinatorial logic gate receiving the first mask signal, a second mask signal and said previous address signal; and
at least a third combinatorial logic gate coupled to and receiving an output of said first combinatorial logic gate and an output of said second combinatorial logic gate.

8. The method of claim 7, further comprising:

receiving, by the mask generator, said previous address signal.

9. The method of claim 8, wherein said at least a first combinatorial logic gate includes a first AND gate receiving said first control signal and the first mask signal from said mask generator;

said at least a second combinatorial logic gate includes a second AND gate receiving the second mask signal from said mask generator and said previous address signal;

a right shift device receiving said first mask signal from said mask generator; and a first OR gate receiving an output signal from said second AND gate and an output signal from said right shift device; and said at least a third combinatorial logic gate includes a second OR gate receiving an output signal from said first AND gate and an output signal from said first OR gate; and generating, by said second OR gate, said next address signal.

10. The method of claim 8, further comprising:

receiving, by a first multiplexer, the first mask signal from the mask generator, a force smaller signal, and a binary zero signal;

said at least a first combinatorial logic gate includes a first AND gate receiving said first control signal and an output signal from said first multiplexer;

said at least a second combinatorial logic gate includes a second AND gate receiving a second mask signal from said mask generator and said previous address signal;

a right shift device receiving said first mask signal from said mask generator; and a first OR gate receiving an output signal from said second AND gate and an output signal from said right shift device;

said at least a third combinatorial logic gate includes a second OR gate receiving an output signal from said first AND gate and an output signal from said first OR gate; and generating, by said second OR gate, one of said next address signal and a signal identifying a lower address than said next address signal.

11. The method of claim 8, further comprising:

receiving, by a first multiplexer the first mask signal from said mask generator, a load alternate address signal and a binary zero signal;

said at least a first combinatorial logic gate includes a first AND gate receiving said first control signal and an output from said first multiplexer;

said at least a second combinatorial logic gate includes a second AND gate receiving a second mask signal from said mask generator and said previous address signal; and a right shift device receiving said first mask signal from said mask generator;

a first OR gate receiving an output signal from said second AND gate and an output signal from said right shift device; and a second multiplexer receiving an output signal from said first OR gate, an alternate address signal and a load alternate address signal; and said at least a third combinatorial logic gate includes a second OR gate receiving an output signal from said first AND gate an output signal from said second multiplexer; and generating, by said second OR gate, one of said next address signal and said alternate address signal.

12. The method of claim 8 wherein said at least a first combinatorial logic gate includes a first OR gate receiving at least one of a load alternate address signal and a force smaller signal;

a first multiplexer receiving the first mask signal from a mask generator, an output signal from said first OR gate and a binary zero signal; and a first AND gate receiving said first control signal and an output signal from said first multiplexer;

said at least a second combinatorial logic gate includes a second AND gate receiving the second mask signal from said mask generator and said previous address signal;

a right shift device receiving said first mask signal from said mask generator;

a second OR gate receiving an output signal from said second AND gate and an output signal from said right shift device; and a second multiplexer receiving an output signal from said second OR gate, an alternate address signal and said load alternate address signal; and said at least a third combinatorial logic gate includes a third OR gate receiving an output signal from said first AND gate and an output signal from said second multiplexer; and generating, by said third OR gate, one of said next address signal, said alternate address signal, and a signal identifying a lower address than said previous address signal.

13. A circuit for determining a next address within a search procedure, comprising:
   a means for determining a next address, said means having a first input and a second input, said first input adapted to receive a previous address signal and said second input adapted to receive a first control signal indicating whether a comparand is greater than a value stored in a previous address signal; and
   a means for generating a mask value based on, said previous address signal;
   wherein said next address determining means generates a next address signal at an output, said next address signal based on both said first input and said second input; and
   wherein said next address determining means is made exclusively of combinatorial logic elements.

14. The circuit of claim 13, further comprising:
   a means for generating said mask value for a means for determining an address, said means adapted to receive said previous address signal.

15. The circuit of claim 14, wherein said determining means further comprises:
   a first means for ANDing said first control signal with a first mask signal from said mask generating means;
   a second means for ANDing a second mask signal from said mask generating means with said previous address signal;
   a means for shifting a bit to the right, said right shifting means adapted to receive said first mask signal from said mask generating means;
   a first means for ORing an output signal from said second ANDing means with an output signal from said right shifting means; and
   a second means for ORing an output signal from said first ANDing means with an output signal from said first ORing means, said second ORing means adapted to output said next address signal.

16. The circuit of claim 14, wherein said determining means farther comprises:
   a first means for multiplexing adapted to receive a first mask signal from said mask generating means, a force smaller signal, and a binary zero signal;
   a first means for ANDing said first control signal with an output signal from said first multiplexing means;
   a second means for ANDing a second mask signal from said mask generating means with said previous address signal;
   a means for shining a bit to the right, said right shifting means adapted to receive said first mask signal from said mask generating means;
   a first means for ORing an output signal from said second means for ANDing with an output signal from said right shifting means;
   a second means for ORing an output signal from said first means for ANDing with an output signal from said first means for ORing, said second means for ORing adapted to output one of said next address signal and a signal identifying a lower address than said next address signal.

17. The circuit of claim 14, wherein said determining means further comprises;
   a first means for multiplexing adapted to receive a first mask signal from said mask generating means, a load alternate address signal, and a binary zero signal;
   a first means for ANDing said first control signal with an output signal from said first multiplexing means;
   a second means for ANDing a second mask signal from said mask generating means with said previous address signal;
   a means for shifting a bit to the right, said right shifting means adapted to receive a first mask signal from said mask generating means;
   a first means for ORing an output signal from said second means for ANDing with an output signal from said right shifting means;
   a second means for multiplexing adapted to receive an output signal from said first means for ORing, an alternate address signal and a load alternate address signal; and
   a second means for ORing an output signal from said first ANDing means with an output signal from said second multiplexing means, said second ORing means adapted to output one of said next address signal and said alternate address signal.

18. The circuit of claim 14, wherein said determining means further comprises:
   a first means for ORing a load alternate address signal with a force smaller signal;
   a first means for multiplexing adapted to receive a first mask signal from said mask generating means, an output signal from said first means for ORing and a binary zero signal;
   a first means for ANDing said first control signal with an output signal from said first multiplexing means;
   a second means for ANDing a second mask signal from said mask generating means with said previous address signal;
   a means for shifting a bit to the right, said right shifting means adapted to receive said first mask signal from said mask generating means;
   a second means for ORing an output signal from said second ANDing means with an output signal from said right shifting means;
   a second means for multiplexing adapted to receive an output signal from said second means for ORing, an alternate address signal and said load alternate address signal; and
   a third means for ORing an output signal from said first means for ANDing with an output signal from said second multiplexing means, said third ORing means adapted to output one of said next address signal, said address signal, and a signal identifying a lower address than said previous address signal.

19. A circuit for implementing a search procedure, comprising:
   a memory device, wherein said memory device is adapted to receive a next address signal and generate a signal representing a value stored in a memory location identified by said next address signal;
   a comparator adapted to receive said generated signal from said memory device and a comparand input signal, said comparator using said generated signal and said comparand input signal to generate a first control signal;

a next address generator having a first input and a second input, said first input adapted to receive a previous address signal and said second input adapted to receive said first control signal from said comparator indicating whether a comparand is greater than said value stored in said memory location, wherein said next address generator generates a next address signal at an output, said next address signal based on both said first input and said second input, and wherein said next address generator is made exclusively of combinatorial logic elements, said next address signal being supplied to said memory device; and a storage device adapted to receive said next address signal from said next address generator and supply said next address signal as said previous address signal to said next address generator.

* * * * *

UNITED STATES PATENT AND TRADEMARK OFFICE
CERTIFICATE OF CORRECTION

PATENT NO.    : 6,314,506 B1
DATED         : November 6, 2001
INVENTOR(S)   : Kevin B. Stanton et al.

It is certified that error appears in the above-identified patent and that said Letters Patent is hereby corrected as shown below:

Column 7,
Line 67, "farther" should be -- further --

Column 11,
Line 41, "farther" should be -- further --
Line 51, "shining" should be -- shifting --

Signed and Sealed this

Eleventh Day of February, 2003

JAMES E. ROGAN
*Director of the United States Patent and Trademark Office*